United States Patent [19]

Meijs et al.

[11] Patent Number: 5,973,089
[45] Date of Patent: Oct. 26, 1999

[54] POLYMERIZABLE PERFLUOROALKYLETHER MACROMER

[75] Inventors: Gordon Francis Meijs, Murrumbena; Bronwyn Glenice Laycock, Heidelberg Heights; John Gerard Steele, North Rocks; Graham Johnson, Peakhurst, all of Australia

[73] Assignees: Novartis AG, Basel, Switzerland; Commonwealth Scientific & Industrial Research Organisation, Campbell, Australia

[21] Appl. No.: 08/776,997

[22] PCT Filed: Mar. 22, 1996

[86] PCT No.: PCT/EP96/01256

§ 371 Date: Dec. 22, 1997

§ 102(e) Date: Dec. 22, 1997

[87] PCT Pub. No.: WO96/31545

PCT Pub. Date: Oct. 10, 1996

[30] Foreign Application Priority Data

Apr. 4, 1995 [AU] Australia .................................. PN2161
May 17, 1995 [AU] Australia .................................. PN3024

[51] Int. Cl.$^6$ ..................................................... C08F 16/24
[52] U.S. Cl. ........................... 526/247; 526/245; 526/246
[58] Field of Search .................................. 526/247, 245, 526/246

[56] References Cited

U.S. PATENT DOCUMENTS 4,933,408   6/1990   Goldenberg .............................. 526/245

FOREIGN PATENT DOCUMENTS

| 0084406A1 | 1/1982 | European Pat. Off. |
| 0330618A2 | 2/1989 | European Pat. Off. |
| 0379462A2 | 1/1990 | European Pat. Off. |
| 0406161A2 | 6/1990 | European Pat. Off. |
| 0493320A2 | 12/1991 | European Pat. Off. |
| WO9415980 | 12/1993 | WIPO . |

*Primary Examiner*—Bernard Lipman
*Assistant Examiner*—N. Sarofim
*Attorney, Agent, or Firm*—Michael U. Lee

[57] ABSTRACT

Macromonomers of the formula I are described:

$$Q\text{-}B(L\text{-}B)_n T \qquad (I)$$

wherein n is at least 1.0;

Q is a polymerizable group;

B may be the same or different and is a difunctional block of molecular weight in the range of from 100 to 4000 and wherein at least one B is a perfluorinated polyether of formula II;

$$-\text{OCH}_2\text{CF}_2\text{O}(\text{CF}_2\text{CF}_2\text{O})_x(\text{CF}_2\text{O})_y\text{CF}_2\text{CH}_2\text{O}- \qquad (II)$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000;

L is a difunctional linking group; and

T is a terminal group.

These macromonomers may be used in the production of contact lenses, corneal implants, cell growth substrate or medical implant.

30 Claims, No Drawings

POLYMERIZABLE PERFLUOROALKYLETHER MACROMER

The invention relates to macromers, polymers and polymeric articles particularly suited for ocular applications and as cell growth substrates. More specifically this invention relates to polymers that are suitable for use in contact lenses, and opthalmic devices, such as epikeratoprostheses.

A wide variety of research has been conducted in the field of biocompatible polymers. The definition of biocompatible depends on the particular application for which the polymer is designed. In order to properly function as a contact lens a material must have a variety of properties including biological and chemical inertness, mechanical stability, optical transparency, oxygen permeability, and tear wettability. It is particularly advantageous for a contact lens to be able to transmit oxygen to the cornea and to be soft and comfortable to permit wear for extended periods. In order to function properly as a corneal implant, such as an epikeratoprosthesis, the polymer, in addition, must allow adhesion and growth of corneal epithelium and be highly biostable as an implant.

Contact lenses can be classified into hard and rigid contact lenses, such as those manufactured from poly (methyl methacrylate), and soft flexible contact lenses such as those manufactured from poly(2-hydroxyethyl methacrylate). Both of these basic types of contact lenses suffer from various limitations. Hard and rigid contact lenses are uncomfortable to wear and thus are not well-tolerated by some patients. Although poly(methyl methacrylate) hard lenses allow the transmission of virtually no oxygen through the lens to support the cornea, there are some classes of rigid lenses that do allow good oxygen passage (for example, silicon-based materials). Notwithstanding this, they suffer from the aforesaid limitation of poor comfort due to their lack of softness. For optimum comfort and handling the modulus of elasticity of the lens material would be from 0.5 to 5.0 MPa, preferably from 1.0 to 2.5 MPa.

Conventional soft contact lenses suffer from the disadvantage that there is insufficient oxygen transmissibility through the lens to support normal corneal physiology. Accordingly, they cannot be worn continuously for extended periods. Clinical symptoms of this lens-induced hypoxia include limbial redness and corneal swelling. Ocular infection may result from extended hypoxia induced by contact lens wear. A minimum oxygen transmissibility would be above 50 Barrer, preferably above 70 Barrer, more preferably above 87 Barrer for continuous wear.

There is a long felt need for contact lens materials that combine the comfort of a soft contact lens with an oxygen transmissibility sufficient to maintain normal corneal physiology. In one aspect the present invention provides materials which address this need.

Contact lenses should be comfortable and suitable for use over extended periods. In order to achieve comfort over extended periods a lens must principally have a low modulus of elasticity (that is, be soft). In addition, it is desirable that it be resistant to fouling by proteins, lipids, mucoids and the like. However, contact lenses must also be of sufficient durability to allow for handling and normal use.

U.S. Pat. No. 4,818,801 describes perfluoropolyether polymers for use as contact lenses. While some lenses manufactured from the perfluoropolyether polymers described in U.S. Pat. No. 4,818,801 have excellent oxygen permeability such lenses are too stiff, or of too high a modulus, to be useful as comfortable extended wear or continuous wear contact lenses.

Thus, there is required a polymer which possesses the combination of high oxygen permeability and a low modulus. We have now found a macromonomer which is suitable for use in the manufacture of such polymers. Accordingly, in its main aspect, this invention provides a macromonomer of the formula I:

$$Q\text{-}B(L\text{-}B)_n T \tag{I}$$

wherein n is at least 1.0;

Q is a polymerizable group;

B may be the same or different and is a difunctional block of molecular weight in the range of from 100 to 4000 and wherein at least one B is a perfluorinated polyether of formula II;

$$-\text{OCH}_2\text{CF}_2\text{O}(\text{CF}_2\text{CF}_2\text{O})_x(\text{CF}_2\text{O})_y\text{CF}_2\text{CH}_2\text{O}- \tag{II}$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000;

L is a difunctional linking group; and

T is a terminal group.

Preferably n is in the range of from 1 to 5, more preferably in the range of from 2 to 4. We have found that the modulus of elasticity in polymers formed from these macromonomers can be controlled by variation of n. In general, increasing n results in polymers with decreased stiffness.

Q is a polymerizable group which preferably comprises an ethylenically unsaturated moiety which can enter into a free radical polymerization reaction. Preferably Q is a group of the formula A $$P_1\text{-}(Y)_m\text{-}(R'\text{-}X_1)_p\text{-} \tag{A}$$

wherein $P_1$ is a free-radical-polymerizable group;

Y is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

R' is a divalent radical of an organic compound having up to 20 carbon atoms;

$X_1$ is —NHCO—, —CONH—, —NHCONH—, —COO—, —OCO—, —NHCOO— or —OCONH—.

A free-radical-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —OCO—.

$X_1$ is preferably —NHCONH—, —NHCOO— or —OCONH—, particularly preferably —NHCOO— or —OCONH—.

In a preferred embodiment, the indices, m and p, are not simultaneously zero. If p is zero, m is preferably 1.

R' is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, R' is a divalent radical having up to 12 carbon atoms, particularly preferably a divalent radical having up to 8 carbon atoms. In a preferred embodiment, R' is furthermore alkylene or arylene having up to 12 carbon atoms. A particularly preferred embodiment of R' is lower alkylene, in particular lower alkylene having up to 4 carbon atoms.

It is particularly preferred that Q be selected from the group consisting of acryloyl, methacryloyl, styryl, acrylamido, acrylamidoalkyl, urethanemethacrylate or any substituted derivatives thereof. Most preferably Q is a compound of formula A wherein $P_1$ is alkenyl of up to 4 carbon atoms, Y is —COO—, R' is alkylene of up to 4 carbon atoms, $X_1$ is —NHCOO— and m and p are each one.

The blocks B may be monomeric, oligomeric or polymeric. The molecular weights and chemical composition of each block B may be the same or different, provided that they fall within the molecular weight range specified above. The blocks B may be hydrophobic or hydrophilic, provided that at least one of the blocks is of formula II. Other suitable blocks B may be derived from poly(alkylene oxides). When one or more of the blocks B is hydrophilic, these blocks are particularly preferably derived from poly(alkylene oxides), more preferably from poly(lower alkylene oxides), most preferred from the polyethylene glycols. It is most preferred that the B blocks are selected from blocks of formula II and poly(alkylene oxides), provided that at least one of the blocks is of formula II. In two very preferred embodiments of the invention there are two B blocks in a macromonomer of formula I which are either both of formula II, or one of which is of formula II while the other is derived from a poly(alkylene oxide), preferably from a poly(lower alkylene oxide), most preferred from polyethylene glycols. "Derived from a poly(alkylene oxide)" in the context of the definition of the B blocks means that such a B block differs from a poly(alkylene oxide) in that the two terminal hydrogens have been abstracted from such poly(alkylene oxide). In order to exemplify this, B denotes, if derived from a polyethylene glycol, —(OCH$_2$CH$_2$)$_a$O— wherein a is the index indicating the number or repeating ethyleneoxy groups.

Preferably x in formula II is in the range of from 0 to 20, more preferably in the range from 8 to 12, and y is in the range from 0 to 25, more preferably in the range from 10 to 14.

The linking group L may be the bivalent residue of any difunctional moiety able to react with hydroxyl. Suitable precursors to L are α,ω-diepoxides, α,ω-diisocyanates, α,ω-diisothiocyanates, α,ω-diacylhalides, α,ω-dithioacylhalides, α,ω-dicarboxylic acids, α,ω-dithiocarboxylic acids, α,ω-dianhydrides, α,ω-diiactones, α,ω-dialkylesters, α,ω-dihalides, α,ω-dialkyl ethers, α,ω-dihydroxymethylamides. It is preferred that the linking group be a bivalent residue (—C(O)—NH—R—NH—C(O)—) of a diisocyanate wherein R is a divalent organic radical having up to 20 carbon atoms.

The divalent radical R is, for example, alkylene, arylene, alkylenearylene, arylenealkylene or arylenealkylenearylene having up to 20 carbon atoms, a saturated bivalent cycloaliphatic group having 6 to 20 carbon atoms or cycloalkylenealkylenecycloalkylene having 7 to 20 carbon atoms.

In a preferred embodiment, R is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, R is alkylene or arylene having up to 12 carbon atoms or a saturated bivalent cycloaliphatic group having 6 to 14 carbon atoms.

In a preferred embodiment, R is alkylene or arylene having up to 10 carbon atoms or a saturated bivalent cycloaliphatic group having 6 to 10 carbon atoms.

In a particularly preferred meaning, R is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenyleneethylenephenylene or phenylenemethylenephenylene.

Some examples of very preferred diisocyanates from which bivalent residues are derived include trimethylhexamethylenediisocyanate (TMHMDI), isophorone diisocyanate (IPDI), methylenediphenyl diisocyanate (MDI) and 1,6-hexamethylenediisocyanate (HMDI).

In Formula I, T is a univalent terminal group which is not polymerizable by free radicals but which may contain other functionality. Preferred terminal groups are hydrogen, alkyl, substituted alkyl, aryl or substituted aryl. More preferred groups T are hydrogen, lower alkyl and phenyl.

Suitable substituents for Q or T may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocyylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

In a preferred embodiment of the present invention there are provided macromonomers of formulae VII to X

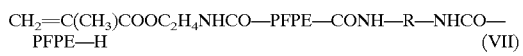
$$CH_2=C(CH_3)COOC_2H_4NHCO-PFPE-CONH-R-NHCO-PFPE-H \quad (VII)$$

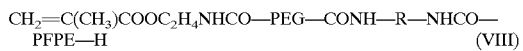
$$CH_2=C(CH_3)COOC_2H_4NHCO-PEG-CONH-R-NHCO-PFPE-H \quad (VIII)$$

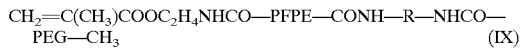
$$CH_2=C(CH_3)COOC_2H_4NHCO-PFPE-CONH-R-NHCO-PEG-CH_3 \quad (IX)$$

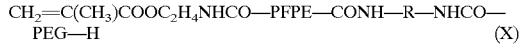
$$CH_2=C(CH_3)COOC_2H_4NHCO-PFPE-CONH-R-NHCO-PEG-H \quad (X)$$

wherein PFPE is of formula II wherein x and y are as defined hereinbefore, R is alkylene, arylene, alkylenearylene, arylenealkylene or arylenealkylenearylene having up to 14 carbon atoms or a saturated divalent cycloaliphatic group having 6 to 14 carbon atoms, and PEG is derived from polyethylene glycol. Preferably PEG has a molecular weight in the range of from 200 to 2000.

In an even more preferred embodiment of the present invention there are provided macromonomers of formulae III to VI

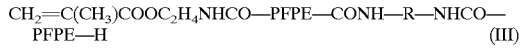
$$CH_2=C(CH_3)COOC_2H_4NHCO-PFPE-CONH-R-NHCO-PFPE-H \quad (III)$$

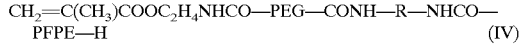
$$CH_2=C(CH_3)COOC_2H_4NHCO-PEG-CONH-R-NHCO-PFPE-H \quad (IV)$$

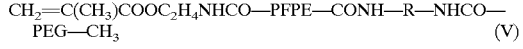
$$CH_2=C(CH_3)COOC_2H_4NHCO-PFPE-CONH-R-NHCO-PEG-CH_3 \quad (V)$$

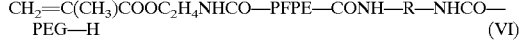
$$CH_2=C(CH_3)COOC_2H_4NHCO-PFPE-CONH-R-NHCO-PEG-H \quad (VI)$$

wherein PFPE is of formula II wherein x and y are as defined hereinbefore, wherein R is the trimethylhexamethylene component of TMHMDI, and PEG is derived from polyethylene glycol. Preferably PEG has a molecular weight in the range of from 200 to 2000. It is also preferred in this embodiment that x is 10 and y is 12.

We have found that in general an appropriate modulus of elasticity and oxygen permeability can be obtained in polymers and copolymers which are derived from these macromonomers. This renders such polymers and copolymers particularly useful in the manufacture of comfortable, extended wear soft contact lenses.

The macromonomers of the present invention may be conveniently prepared from commercially available perfluorinated polyethers (such as Z-Dol, available from Minnesota Mining and Manufacturing Company, St Paul, Minn., USA) by procedures well known in the art of polymer synthesis. These procedures typically involve mixing the perfluorinated polyether, and a precursor to the polymerizable group (such as isocyanatoethyl methacrylate) with a precursor to the linking group (such as trimethylhexamethylenediisocyanate). Other reactive polymer blocks (such as those terminated by hydroxyl or amino) may be added. Optionally, catalysts (such as dibutyltin dilaurate) and solvents may be used. While the reactants may be mixed together at one time, they are preferably added sequentially to the polymerization mixture. It is particularly preferred that the precursor to the polymerizable group is slowly added to the perfluorinated polyether before it is reacted with the precursor to the linking groups.

It will be appreciated that the above procedure may result in a mixture of monofunctionalized macromonomer of the present invention, and a proportion of difunctionalized and unfunctionalized material. We have found that by selecting a 1:1 molar ratio of the precursor to the polymerizable group and exercising control over the reaction conditions a high proportion of monofunctional macromonomer may be produced.

We have found that it is also possible to prepare the macromonomer of the present invention from a preformed monofunctional block.

In another aspect, this invention provides a process for the production of polymers. The macromonomers of the present invention may be copolymerized or homopolymerized to afford transparent polymer in the presence of a suitable initiator. Standard methods well known in the art for effecting polymerization may be utilized, with free radical polymerization being preferred. Free radical polymerization can be simply carried out by radiating (using ultra-violet light) monomer mixtures containing a UV initiator, such as benzoin methyl ether, in an appropriate container or vessel. The mixture is irradiated for a sufficient time to enable the polymerization to take place. Alternatively, thermal initiation using a thermal initiator such as azobisisobutyronitrile, can be employed.

The macromonomer can be converted to polymer neat or in the presence of one or more solvents and/or comonomers. While the structure of the macromonomer has the most significant effect on the resulting modulus, the choice of solvent and comonomer also has an effect. Useful solvents include those selected from the following classes: esters, alcohols, ethers, and halogenated solvents. Fluorinated solvents are particularly useful and their use in combination with other solvents (in ratios varying from 1:9 to 9:1) from the classes above is especially desirable. Solvent concentrations of between 0–70% w/w, particularly 10–50% w/w in the polymerization mixture are desirable. Preferred solvents include acetates, particularly isopropyl acetate and tert-butyl acetate, 2-(trifluoromethyl)-2-propanol, chlorofluoroalkanes, particularly trichlorotrifluoroethane, and perfluorinated alkanes, such as perfluoro-1,3-dimethylcyclohexane and the like.

Comonomers comprising one or more ethylenically unsaturated groups which can enter into a reaction to form a copolymer may be incorporated. It is preferred that the ethylenically unsaturated group be selected from the group consisting of acryloyl, methacryloyl, styryl, acrylamido, acrylamidoalkyl, urethanemethacrylate, or any substituted derivatives thereof.

A comonomer present in the novel polymer can be hydrophilic or hydrophobic or a mixture thereof. Suitable comonomers are, in particular, those which are usually used in the production of contact lenses and biomedical materials. A hydrophobic comonomer is taken to mean a monomer which typically gives a homopolymer which is insoluble in water and can absorb less than 10% by weight of water. Analogously, a hydrophilic comonomer is taken to mean a monomer which typically gives a homopolymer which is soluble in water or can absorb at least 10% by weight of water.

Suitable hydrophobic comonomers are, without limitation thereto, $C_1$–$C_{18}$alkyl and $C_3$–$C_{18}$cycloalkyl acylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$ aloalkenes, styrene, (lower alkyl)styrene, lower alkyl vinyl ethers, $C_2$–$C_{10}$perfluoroalkyl acrylates and methacrylates and correspondingly partially fluorinated acrylates and methacrylates, $C_3$–$C_{12}$perfluoroalkylethylthiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like.

Preference is given, for example, to acrylonitrile, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic comonomers are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilylpropyl methacrylate (hereinafter: Tris methacrylate), tristrimethylsilyloxysilylpropyl acrylate (hereinafter: Tris acrylate), 3-methacryloxy propylpentamethyldisiloxane and bis(methacryloxypropyl) tetramethyldisiloxane.

Preferred examples of hydrophobic comonomers are methyl methacrylate, Tris acrylate, Tris methacrylate and acrylonitrile.

Suitable hydrophilic comonomers are, without this being an exhaustive list, hydroxyl-substituted lower alkyl acrylates and methacrylates, acrylamide, methacrylamide, (lower alkyl)acrylamides and -methacrylamides, ethoxylated acrylates and methacrylates, hydroxyl-substituted (lower alkyl) acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino) (lower alkyl) acrylates and methacrylates, allyl alcohol and the like. Preference is given, for example, to N-vinyl-2-pyrrolidone, acrylamide, methacrylamide, hydroxyl-substituted lower alkyl acrylates and methacrylates, hydroxy-substituted (lower alkyl) acrylamides and -methacrylamides and vinylically unsaturated carboxylic acids having a total of 3 to 5 carbon atoms.

Examples of suitable hydrophilic comonomers are hydroxyethyl methacrylate (HEMA), hydroxyethyl acrylate, hydroxypropyl acrylate, trimethylammonium 2-hydroxy propylmethacrylate hydrochloride (Blemer® QA, for example from Nippon Oil), dimethylaminoethyl methacrylate (DMAEMA), dimethylaminoethyl (meth)acrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, N-vinyl-2-pyrrolidone (NVP), acrylic acid, methacrylic acid and the like.

Preferred hydrophilic comonomers are trimethylammonium 2-hydroxy propylmethacrylate hydrochloride, 2-hydroxyethyl methacrylate, dimethylaminoethyl methacrylate, trimethylammonium 2-hydroxypropylmethacrylate hydrochloride, N,N-dimethylacrylamide and N-vinyl-2-pyrrolidone.

As stated hereinbefore, suitable comonomers include fluorine- and silicon-containing alkyl acrylates and hydrophilic comonomers, which may be selected from a wide range of commercially available materials, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris (trimethylsilyloxy)propyl methacrylate or acrylate, and amine-containing comonomers, such as N,N-dimethylaminoethyl methacrylate, N,N-dimethyl acrylamide and N,N-dimethylaminoethyl-acrylamide. The preferred range for addition of individual comonomers into the formulation is from 0 to 60% by weight and most preferably 0 to 40% by weight of the formulation. Mixtures of macromonomers of formula I may also be used to make suitable copolymers with or without other comonomers.

A polymer network can, if desired, be reinforced by addition of a crosslinking agent, for example a polyunsaturated crosslinking comonomer. In this case, the term crosslinked polymers is used. The invention, therefore, furthermore relates to a crosslinked polymer comprising the product of the polymerization of a macromer of the formula (I), if desired with at least one vinylic comonomer and with at least one crosslinking comonomer.

Examples of typical crosslinking comonomers are allyl (meth)acrylate, lower alkylene glycol di(meth)acrylate, poly (lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth) acrylate, methylenebis(meth)acrylamide, triallyl phthalate and diallyl phthalate.

If a crosslinking comonomer is used, the amount used is in the range of from 0.05 to 20% of the expected total weight of polymer, preferably the comonomer is in the range of 0.1 to 10%, and more preferably in the range of 0.1 to 2%.

According to a further aspect of the present invention there is provided a polymer produced by the process herein defined wherein the polymer is formed from at least one macromonomer as herein defined.

According to a further aspect of the present invention there is provided a soft contact lens manufactured from polymers or copolymers as hereinbefore described. Soft contact lenses are crosslinked polymer disks with surfaces of differing radii of curvature. The radii are selected in combination with the refractive index of the polymer so that the desired optical correction is obtained and the inner surface of the lens matches the contour of wearer's cornea. They are normally sold in sterile saline. Optionally the surface of the lens may be modified by coating using procedures well known to the art, such as plasma polymerisation, glow discharge or grafting of a more hydrophilic polymer.

By way of example, in the manufacture of such lenses the appropriate quantities of polymerizable monomers, solvent (if required) and photoinitiator are mixed together to form a polymerization mixture. The polymerization mixture is then flushed with nitrogen and the required quantity dispensed into the concave half of a polypropylene mould. The mould is closed and clamped and the assembly is placed into a UV irradiation cabinet equipped with UV lamps. The irradiation is performed for the required time and then the halves of the mould are separated. The polymerized lens is extracted in an appropriate solvent (for example, an isopropyl or tert-butylacetate/fluorinated solvent mixture). The solvent is then extensively exchanged with an alcohol (for example, isopropyl alcohol) and subsequently with saline to yield the product lens.

Another aspect of this invention is the use of the polymers in applications depending on the growth of cells. The polymers and polymeric materials of this invention unexpectedly have the property of being suitable for the attachment and growth of cells and outgrowth of corneal tissue, and have properties that make them suitable for use as corneal implants (which may be referred to as "artificial corneas"), cell growth substrates, materials for the attachment and growth of human or animal cells in vivo or in vitro, medical implants (such as implantable semipermeable membrane materials, tissue implants in cosmetic surgery, implants containing hormone secreting cells such as pancreatic islet cells, breast implants, and the like), in artificial organs, tissue culture apparatus (such as bottles, trays, dishes and the like) in biological reactors (such as those used in the production of valuable proteins and other components by cell culture), in optical instruments, and the like. The polymers may also be used in soft membrane materials, controlled drug release compositions, gas separation membranes, ion transport membranes and the like.

According to another aspect of this invention there is provided a corneal implant manufactured from polymers or copolymers as described herein. Corneal implants may be produced according to the procedures already described for the production of soft contact lenses. Corneal implants may be placed by way of conventional surgical techniques beneath, within, or through corneal epithelial tissue, or within the corneal stroma or other tissue layers of the cornea. Such implants may change the optical properties of the cornea (such as to correct visual deficiencies) and/or change the appearance of the eye, such as pupil coloration. A corneal implant may comprise an optical axis region which on implantation covers the pupil and provides visual acuity, and a region which surrounds the periphery of the optical axis region. The implant may have the same visual acuity across its dimensions.

It has been found that the flow of high molecular weight tissue fluid components such as proteins and glycoproteins (for example, growth factors, peptide and protein hormones, and proteins associated with the transport of essential metals) and the like across a corneal implant, that is, between epithelial cells and stromal cells and even the endothelial layer and beyond, is important for long term maintenance and viability of tissue anterior and posterior to a corneal implant. This aspect is disclosed in International Patent Application No. PCT/EP93/03680. Accordingly, the corneal implant is advantageously prepared with a porosity sufficient to allow passage therethrough of tissue fluid components having a molecular weight greater than about 10,000 daltons, thereby providing for a flux of tissue fluid components in addition to small molecular weight nutrients (such as glucose, fats and amino acids) and respiratory gases between cells anterior of the implant and cells posterior thereof.

The porosity of the corneal implant may be provided by virtue of the material from which the implant is formed, that is, by the inherent porosity of the material. Alternatively, pores may be introduced into the polymers or copolymers according to this invention from which the implant is formed by various procedures well known in the art such as those described in WO 90/07575, WO 91/07687, U.S. Pat. No. 5,244,799, U.S. Pat. No. 5,238,613, U.S. Pat. No. 4,799,931 and U.S. Pat. No. 5,213,721.

Regardless of the methods of formation of the requisite porosity of the implant of the invention, the implant preferably has a porosity sufficient to admit proteins and other biological macromolecules of a molecular weight up to and greater than 10,000 daltons, such as from 10,000 to 1,000,000 daltons, but not sufficient to admit cells and thus tissue invasion into the optical axis region of the corneal onlay. Where porosity of the implant is provided by pores, the optical axis region comprises a plurality of pores, the number of which is not in any way limiting, but which is sufficient to provide flow of tissue components between the anterior and posterior regions of an implant. Preferably, the pores formed within the optical axis region do not cause refraction of visible light to an extent that would cause any problem with regard to vision correction. It is to be understood that the term pore does not put any geometric limitation on the nature of the pores which may be of regular or irregular morphology. It should be recognized that not all pores may be of the same diameter.

Outside of the optical axis region, the corneal implant may have the same porosity as the optical axis region. Alternatively, this region of the implant surrounding the periphery of the optical axis region, which may be referred to as the skirt, may allow the ingrowth of cells of the cornea thereby assisting in anchorage of the implant to the eye.

Porosity in the skirt may be an inherent feature of the material from which the skirt is formed. In this regard it is to be appreciated that the skirt may be formed of the same material as the optical axis region and may be integral therewith. In this situation, pores of differing diameter may be formed in the optical axis region and the skirt. Alternatively, the skirt may be formed of a different material from the optical axis region, which material is of a higher porosity than the optical axis region so as to allow this tissue ingrowth. Preferably the skirt may be comprised of an optically transparent polymer as is the optical axis region, but alternatively, the skirt may be comprised of an optically non-transparent material or may be made of a porous material that is not optically transparent.

The polymers and polymeric materials of this invention are superior to other materials described for use as corneal implants (such as hydrogel materials) as they support cell attachment and growth without the need for specific surface modification (such as radio frequency glow discharge plasma modification (see U.S. Pat. No. 4,919,659 and PCT/AU89/00220) or radiation grafting or chemical treatment. Having said this, the polymer surface may be modified by established procedures to enhance cell attachment and growth. With the polymers of this invention, as with previously described materials, the initial cell colonization of the surface of an implant may be promoted in the short term by the inclusion on the surface of biological factors that stimulate corneal epithelial cell adhesion and migration. These factors include fibronectin, chondroitin sulphate, collagen, laminin, neurite-promotion factor, thrombospondin, cell attachment proteins, anti-gelatine factor, cold insoluble globulin, epidermal growth factor, mussel adhesive protein and the like, and/or derivatives, active fragments, and mixtures thereof. Fibronectin, epidermal growth factor, and/or derivatives, active fragments, and mixtures thereof are particularly useful.

The mechanical properties of the polymers according to the invention are suitable for use as corneal implants, with the modulus of the materials being between about 0.5 to 10 MPa. This modulus provides a suitable flexibility for a corneal implant to allow insertion into the eye, for example, anterior of the Bowmans membrane region.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The present invention is further described in the following non-limiting examples. If not otherwise specified, all parts are by weight. Temperatures are in degrees Celsius. Molecular weights of macromers or polymers are number average molecular weights if not otherwise specified.

EXAMPLE 1

This example illustrates the synthesis of a macromonomer of the present invention. Into a 250 mL round bottomed flask is placed 150 g of hydroxy terminated PFPE (commercially available from Minnesota Mining and Manufacturing Company, St Paul, Minn., U.S.A, under the trade name Z-DOL) of hydroxyl number 55.4 and 11.49 g of freshly distilled isocyanatoethyl methacrylate. After shaking the mixture vigorously for several minutes, 0.09 g of dibutyltin dilaurate is added. The mixture is then shaken for a further 5 minutes before being stirred overnight. An infrared spectrum is recorded to confirm the disappearance of the isocyanate peak. 15.58 g of distilled trimethylhexamethylene diisocyanate is added to the mixture, which is then stirred for several minutes and then 0.10 g of dibutyltin dilaurate is added. After again being vigorously shaken for several minutes, the mixture is stirred overnight. To the mixture is then added 14.81 g of dry polyethylene glycol (molecular weight 200). After stirring the mixture for several minutes, 0.12 g of dibutyltin dilaurate is added. The flask is shaken vigorously and the mixture stirred overnight. Again, an infrared spectrum is recorded to confirm the disappearance of the isocyanate. This procedure produces a mixture containing a high proportion of the desired macromonomer of Formula VI.

EXAMPLE 2

The macromonomer from Example 1 is purified using the following technique:

To 3.0 g of the crude macromonomer in a vial is added 15 ml of a 50:50 v/v mixture of trichlorotrifluoroethane/t-butyl acetate. After suspending the macromonomer in this solvent mix by shaking, the mixture is transferred to a separatory funnel. The solution is washed with 10 ml of distilled water. The bottom layer is collected in a round-bottomed flask and the solvent removed under high vacuum. The residue is then suspended in 15 g of a perfluorinated alkane solvent PF5060 (available from Minnesota Mining and Manufacturing Company, St Paul, Minn., U.S.A). The top layer is retained and once again the solvent removed under high vacuum. This gives a purified macromonomer.

EXAMPLE 3

This example illustrates the synthesis of another macromonomer of the present invention. Into a 25 ml glass vial is placed 10.025 g of dried bis-hydroxy terminated PFPE of hydroxyl number 55.4 and 0.768 g of freshly distilled isocyanatoethyl methacrylate. After stirring the mixture vigorously for several minutes, 0.002 g of dibutywtin dilaurate is added. The mixture is then stirred overnight. An infrared spectrum is recorded to confirm the disappearance of the isocyanate peak. To the reaction mixture is then added 1.041 g of distilled trimethylhexamethylene diisocyanate. After stirring for several minutes, 0.01 g of dibutyltin dilaurate is added and the mixture is stirred overnight. To the mixture is then added 10.025 g of dried bis-hydroxy terminated PFPE. After stirring for several minutes, 0.01 g of dibutyltin dilaurate is added and the mixture is stirred overnight. Again, an infrared spectrum is recorded to confirm the disappearance of the isocyanate. This procedure produces a mixture containing a high proportion of the desired macromonomer of Formula III.

EXAMPLE 4

The macromonomer from Example 3 is purified according to the following technique:

To 14.6 g of the crude macromonomer in a vial is added 43.9 g of trichlorotrifluoroethane. After dissolving the macromonomer in this solvent by stirring, the mixture is transferred to a separating funnel. The solution is washed with 25 ml of distilled water. The bottom layer is collected in a round-bottomed flask and the solvent removed under high vacuum. The residue is then suspended in 77.3 g of PF5060. The top layer is retained and once again the solvent removed under high vacuum. This gives a purified macromonomer.

EXAMPLE 5

This example illustrates the synthesis of another macromonomer of the present invention. Into a 25 ml glass vial is placed 1.685 g of dry monomethylated polyethylene glycol (molecular weight 350) and 1.012 g of distilled trimethylhexamethylene diisocyanate. After stirring the mixture vigorously for several minutes, 0.01 g of dibutyltin dilaurate is added. The mixture is then stirred overnight. To the reaction mixture is then added 9.751 g of bis-hydroxy terminated PFPE. After stirring for several minutes, 0.006 g of dibutyltin dilaurate is added and the mixture is stirred overnight. To the mixture is then added 0.958 g of distilled isocyanatoethyl methacrylate. After stirring for several minutes, 0.01 g of dibutyltin dilaurate is added and the mixture is stirred overnight. Again, an infrared spectrum is recorded to confirm the disappearance of the isocyanate. This procedure produces the desired macromonomer of Formula V.

EXAMPLE 6

The macromonomer from Example 5 is purified according to the following technique:

To 13.432 g of the crude macromonomer in a vial is added 42.0 g of chloroform. After dissolving the macromonomer in this solvent by stirring, the mixture is transferred to a separatory funnel. The solution is washed with 12 ml of distilled water. The bottom layer is collected, dried over magnesium sulphate, filtered and the solvent is removed under high vacuum. This gives a purified macromonomer.

EXAMPLE 7

This example illustrates the synthesis of another macromonomer of the present invention. Into a 25 ml glass vial is placed 1.169 g of dry polyethylene glycol (molecular weight 200) and 0.907 g of distilled isocyanatoethyl methacrylate. After stirring the mixture vigorously for several minutes, 0.008 g of dibutyltin dilaurate is added. The mixture is then stirred overnight. To the reaction mixture is then added 1.229 g of distilled trimethylhexamethylene diisocyanate.

After stirring for several minutes, 0.001 g of dibutyltin dilaurate is added and the mixture is stirred overnight. To the mixture is then added 11.840 g of bis-hydroxy terminated PFPE. The mixture is then stirred overnight. Again, an infrared spectrum is recorded to confirm the disappearance of the isocyanate. This procedure produces a mixture containing a high proportion of the desired macromonomer of Formula IV.

EXAMPLE 8

The following composition is placed in a propylene lens mould and polymerised for 3 h under irradiation from 365 nm UV lamps.

Macromonomer of Example 1 68.1 parts
N,N-Dimethylaminoethyl methacrylate 11.9 parts
Benzoin methyl ether 0.3 parts
Isopropyl acetate 20 parts After polymerization is complete, the resulting lenses are demoulded and extracted at room temperature in trichlorotrifluoroethane for three hours, then placed in tert-butyl acetate (t-BuAc) overnight, then in a 50/50 mixture of t-BuAc/isopropyl alcohol (IPA) for three hour and finally into neat IPA for 3 hours. The lenses are then dried overnight at 30° C. in a vacuum oven before being hydrated in saline for several days. After extraction and hydration, the oxygen transmissibility is measured on the resulting clear polymer lenses and shown to be 99 Barrers. The modulus is 1.9 MPa. The water content is 14%.

EXAMPLE 9

The following composition is placed in a polypropylene lens mould and polymerised for 3 h under irradiation from 365 nm UV lamps.

Macromonomer of Example 2 68.2 parts
N,N-Dimethylaminoethyl methacrylate 11.9 parts
Benzoin methyl ether 0.3 parts
Isopropyl acetate 20 parts After demoulding, the lenses are extracted and hydrated using the procedure of Example 8. The oxygen transmissibility is measured on the resulting clear polymer lens and shown to be 100 Barrers. The modulus is 2.2 MPa. The water content is 12%.

EXAMPLE 10

The following composition is placed in a polypropylene lens mould and polymerised for 3 h under irradiation from 365 nm UV lamps.

Macromonomer of Example 4 68 parts
N,N-Dimethylaminoethyl methacrylate 12 parts
Isopropyl acetate 20 parts
Benzoin methyl ether 0.3 parts After demoulding, the lenses are extracted and hydrated using the procedure of Example 8. The oxygen transmissibility is measured on the resulting clear polymer lenses and shown to be 105 Barrers. The modulus is 0.92 MPa. The water content is 15%.

EXAMPLE 11

The following composition is placed in a polypropylene lens mould and polymerized for 3 h under irradiation from 365 nm UV lamps.

Macromonomer of Example 6 63 parts
N,N-Dimethylaminoethyl methacrylate 7 parts
Isopropyl acetate 30 parts
Benzoin methyl ether 0.3 parts After polymerization is complete, the resulting lenses are demoulded and extracted at room temperature in PF5060 (a perfluorinated solvent available from Minnesota Mining and Manufacturing Company (3M)) for three hours, then placed in tert-butyl acetate (t-BuAc) overnight, then in a 50/50 (v/v) mixture of t-BuAc/isopropyl alcohol (IPA) for three hour and finally into neat IPA for 3 hours. The lenses are then dried overnight at 30° C. in a vacuum oven before being hydrated in saline for several days. The oxygen transmissibility is measured on the resulting clear polymer lenses and shown to be 117 Barrers. The modulus is 0.73 MPa. The water content is 19%.

EXAMPLE 12

The following composition is placed in a polypropylene lens mould and polymerized for 3 h under irradiation from 365 nm UV lamps.

Macromonomer of Example 7 72 parts
N,N-Dimethylaminoethyl methacrylate 8 parts
Isopropyl acetate 20 parts
Benzoin methyl ether 0.3 parts After demoulding, the lenses are extracted and hydrated using the procedure of Example 8. The oxygen transmissibility is measured on the resulting clear polymeric lenses and shown to be 63 Barrers. The modulus is 0.92 Mpa. The water content is 22%.

EXAMPLE 13

The following composition is placed in a polypropylene lens mould and polymerized for 3 h under irradiation from 365 nm UV lamps.

Macromonomer of Example 2 59.5 parts
N,N-Dimethylaminoethyl methacrylate 10.5 parts
Isopropyl acetate 20 parts
Benzoin methyl ether 0.3 parts After demoulding, the lenses are extracted and hydrated using the procedure of Example 8. The oxygen transmissibility is measured on the resulting clear polymeric lenses and shown to be 97 Barrers. The modulus is 1.6 Mpa. The water content is 13%.

EXAMPLE 14

The following composition is placed in a polypropylene lens mould and polymerized for 3 h under irradiation from 365 nm UV lamps.

Macromonomer of Example 2 57 parts
N,N-Dimethylaminoethyl methacrylate 13 parts
Isopropyl acetate 30 parts
Benzoin methyl ether 0.3 parts After demoulding, the lenses are extracted and hydrated using the procedure of Example 11. The oxygen transmissibility is measured on the resulting clear polymeric lenses and shown to be 85 Barrers. The modulus is 1.8 Mpa. The water content is 18%.

EXAMPLE 15

The following composition is placed in a polypropylene lens mould and polymerized for 3 h under irradiation from 365 nm UV lamps.

Macronomer of Example 4 59 parts

N,N-Dimethylaminoethyl methacrylate 11 parts

Isopropyl acetate 30 parts

Benzoin methyl ether 0.3 parts

After demoulding, the lenses are extracted and hydrated using the procedure of Example 11. The oxygen transmissibility is measured on the resulting clear polymeric lenses and shown to be 102 Barrers. The modulus is 0.68 Mpa. The water content is 17%.

EXAMPLE 16

The following composition is placed in a polypropylene flat mould (0.2 mm thick) and polymerized for 3 h under irradiation from 365 nm UV lamps.

Macronomer of Example 2 70 parts

Isopropyl acetate 30 parts

Benzoin methyl ether 0.3 parts

After demoulding, the resulting discs are extracted at 37° C. in PF5060 for three hours, then placed in isopropyl acetate (IPAc) overnight, then in a 50/50 (v/v) mix of IPAc/isopropyl alcohol (IPA) for three hours and into fresh IPA for a further three hours. The discs are dried overnight at 30° C. in a vacuum oven on filter paper before being hydrated in saline for several days. After extraction and hydration, the water content is measured and found to be 2.4%.

EXAMPLE 17

The formulation of example 13 is placed in a polypropylene flat mold (0.2 mm thick) and polymerized for 3 h under irradiation from 365 nm UV lamps. After demoulding, the resulting polymeric discs are extracted and hydrated using the procedure of Example 16. The water content is measured and found to be 14.6%. The sessile contact angle was measured and found to be 92 degrees.

EXAMPLE 18

The formulation of example 14 is placed in a polypropylene flat mold (0.2 mm thick) and polymerized for 3 h under irradiation from 365 nm UV lamps. After demoulding, the resulting polymeric discs are extracted and hydrated using the procedure of Example 16. The water content is measured and found to be 15.7%. The sessile contact angle was measured and found to be 92 degrees.

EXAMPLE 19

The formulation of example 15 is placed in a polypropylene flat mold (0.2 mm thick) and polymerized for 3 h under irradiation from 365 nm UV lamps. After demoulding, the resulting polymeric discs are extracted and hydrated using the procedure of Example 16. The water content is measured and found to be 15.8%. The sessile contact angle was measured and found to be 90 degrees.

EXAMPLE 20

The following procedure was used to evaluate cell attachment and growth of corneal epithelial cells and stromal fibroblast cells on the polymers:

Bovine corneal epithelial cells (BCEp) and bovine corneal stromal fibroblasts (BCF), of between culture passage numbers 2–4, were used to determine the relative cell attachment and growth performance of each copolymer. Test polymers were cut into 6 mm diameter disks using a sterile Dermapunch (Registered trademark), with each sample prepared in triplicate. Replicate polymer samples were transferred to individual wells of a 96-well format tissue culture polystyrene (TCPS) tray and left overnight at room temperature in a phosphate-buffered saline solution containing 60 $\mu$g/ml penicillin and 100 $\mu$g/ml streptomycin. Cells were seeded onto each sample surface, including replicates of TCPS alone, at a density of $5\times10^3$ cells/well and cultured for seven days in a culture medium containing Dulbecco's Minimal Essential Medium and Ham's F12 (50:50, v/v) supplemented with 5 $\mu$g/ml insulin, 5 $\mu$g/ml transferrin, 5 $\mu$g/ml selenious acid, 60 $\mu$g/ml penicillin and 100 $\mu$g/ml streptomycin and foetal bovine serum (with BCEp cells, 20% (v/v) serum was used but with BCF cells, 10% (v/v) was used). These cultures were maintained at 37° C. in a humidified atmosphere of 5% $CO_2$ in air. The culture medium was changed every second day. To determine the relative cell numbers present on each sample at the completion of the 7 day culture period, the cells were fixed with formol-saline and then stained with methylene blue (1% w/v in borate buffer, pH 8.4). The relative number of cells was determined from the adsorbed dye, colorimetrically on an ELISA plate-reader, and the adsorbances were expressed as a mean (±SD) percentage of the absorbance value obtained for cells grown on the TCPS contral surface after the same period of time.

The following results were found: Bovine corneal epithelial cells attached and grew on the polymer formulation of Examples 17 and 19 indicating that these polymers are suitable for the attachment and growth of corneal epithelial cells and tissue. The number of corneal epithelial cells present on the polymer surface after 7 days [n=4] of culture was 48% (Example 19) or 60% (Example 17) of that present on the TCPS surface. The cells cultured on the polymer surface showed the well spread morphology that was also seen for the cells cultured on the TCPS surface.

Bovine corneal stromal fibroblasts attached and grew on the polymer formulations of Examples 16, 17, 18 and 19 and the number of cells present on the polymer surfaces were between 40% and 80% of that seen on the TCPS surface, after 7 days of culture [n=4].

In more detail, the number of cells present on the polymer surfaces were 47% (Example 16), 58% (Example 17), 44% (Example 18) and 78% (Example 19) of that seen on the TCPS surface, after 7 days of culture [n=4].

These data indicate that the polymers according to this invention are suitable for application in artificial cornea and other implants as well as cell attachment and growth substrata.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

We claim:

1. A macromonomer of the formula I:

$$Q\text{-}B(L\text{-}B)_n T \qquad (I)$$

wherein n is 1;

Q is a polymerizable group selected from the group consisting of acryloyl, methacryloyl, styryl, acrylamido, acrylamidoalkyl, urethanemethacrylate and any substituted derivatives thereof;

B may be the same or different and is a difunctional block of molecular weight in the range of from 100 to 4000, wherein at least one t is a perfluorinated polyether of formula II;

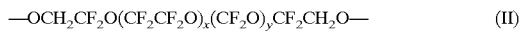 (II)

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000;

L is a difunctional linking group; and

T is a univalent terminal group which is not polymerizable by free radicals.

2. A macromonomer according to claim 1 wherein Q is a polymerizable group which comprises an ethylenically unsaturated moiety.

3. A macromonomer according to claim 1 wherein L is a bivalent residue (—C(O)—NH—R—NH—C(O)—) of a diisocyanate.

4. A macromonomer according to claim 3 wherein the bivalent residue is derived from a diisocyanate selected from the group consisting of trimethylhexamethylenediisocyanate (TMHMDI), isophorone diisocyanate (IPDI), methylenediphenyl diisocyanate (MDI) and 1,6-hexamethylenediisocyanate (HMDI).

5. A macromonomer according to claim 3 wherein T is selected from the group consisting of hydrogen, alkyl, substituted alkyl, aryl and substituted aryl.

6. A macromonomer according to claim 1 wherein x is in the range of from 0 to 20.

7. A macromonomer according to claim 6 wherein x is in the range from 8 to 12.

8. A macromonomer according to claim 1 wherein y is in the range of from 0 to 25.

9. A macromonomer according to claim 8 wherein y is in the range from 10 to 14.

10. A macromonomer selected from the group consisting of macromonomers of formula III to VI:

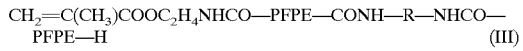 (III)

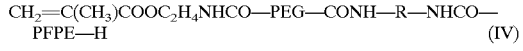 (IV)

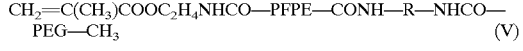 (V)

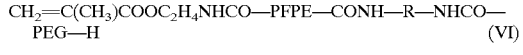 (VI)

wherein PFPE is of formula II, R is the trimethylhexamethylene component of TMHMDI, and wherein x is 10 and y is 14 and PEG is derived from polyethylene glycol.

11. A process for the production of a polymer comprising the step of polymerizing a macromonomer of claim 1.

12. A process according to claim 11 wherein the macromonomer is polymerized in the presence of at least one solvent which is selected from the group consisting of esters, alcohols, ethers, and halogenated solvents.

13. A process according to claim 12 wherein the solvent is selected from the group consisting of isopropyl acetate, tert-butyl acetate, 2-(trifluoromethyl)-2-propanol, trichlorotrifluoroethane and perfluoro-1,3-dimethylcyclohexane.

14. A process according to claim 11 wherein the macromonomer is copolymerized with at least one comonomer comprising one or more ethylenically unsaturated groups selected from the group consisting of acryloyl, methacryloyl, styryl, acrylamido, acrylamidoalkyl, urethanemethacrylate, or any substituted derivatives thereof and mixtures thereof.

15. A process according to claim 14 wherein the comonomer is selected from the group consisting of dihydroperfluorooctyl acrylate, 1,1-dihydroperfluorobutyl acrylate, tris (trimethylsilyloxy)propyl methacrylate or acrylate, and amine-containing comonomers, such as N,N-dimethylaminoethyl methacrylate and N,N-dimethylaminoethyl-acrylamide, and mixtures thereof.

16. A process according to claim 11 wherein the macromonomer is copolymerized with at least one comonomer wherein each comonomer is present in the polymerization formulation in the range of from 0 to 60 parts.

17. A process according to claim 11 wherein the macromonomer is copolymerized with at least one comonomer wherein each comonomer is present in the polymerization formulation in the range of 0 to 40 parts.

18. A polymer produced by a process according to claim 11.

19. A soft contact lens manufactured from a polymer produced by a process according to claim 11.

20. A soft contact lens comprising a macromonomer according to claim 1.

21. A corneal implant comprising a macromonomer according to claim 1.

22. A process for the production of a soft contact lens according to claim 19 wherein said process comprises the steps of:
(a) mixing at least one macromonomer according to any one of claims 1 to 15 with an optional solvent, a photoinitiator, an optional comonomer to form a polymerization mixture;
(b) flushing the polymerization mixture with nitrogen;
(c) charging the polymerization mixture into the concave half of a polypropylene mould;
(d) closing the charged mould;
(e) irradiating the charged mould with UV radiation; and
(f) separating the halves of the mould and extracting the polymerized lens.

23. A corneal implant comprising a polymerized macromonomer according to claim 1.

24. A corneal implant according to claim 23 for use in surgical implantation into or onto the cornea of a mammal wherein said implant has an optical axis region with optical characteristics which provide visual acuity therethrough and a porosity sufficient to allow passage therethrough of tissue fluid components having a molecular weight greater than 10,000 daltons, thereby providing for a flux of tissue fluid between cells anterior of the implant and cells posterior thereof, wherein the porosity of the optical axis region is such that it allows the flux of tissue fluid components whilst excluding ingrowth of ocular tissue.

25. A corneal implant according to claim 23, wherein the implant is coated with one or more components which promote the growth of tissue adjacent to the implant and/or cell adhesion to the implant.

26. A corneal implant according to claim 23 wherein porosity of the implant is provided by a plurality of pores having a size sufficient to allow passage through the implant of proteinaceous tissue fluid components having a molecular weight greater than 10,000 daltons but which excludes tissue ingrowth.

27. A corneal implant according to claim 26 wherein said plurality of pores comprise a diameter between 15 nanometers and 0.5 micrometers.

28. A cell growth substrate comprising a polymerized macromonomer according to claim 1.

29. A medical implant comprising a polymerized macromonomer according to claim 1.

30. A contact lens formed by polymerization of a macromonomer of formula I:

$$Q\text{-}B(L\text{-}B)_n T \qquad (I)$$

wherein n is from 1 to 5;

Q is a polymerizable group selected from the group consisting of acryloyl, methacryloyl, styryl, acrylamido, acrylamidoalkyl or urethanemethacrylate or any substituted derivatives thereof, B may be the same or different and is a difunctional block of molecular weight in the range of from 100 to 4000 and wherein at least one B is a perfluorinated polyether of formula II:

$$-\text{OCH}_2\text{CF}_2\text{O}(\text{CF}_2\text{CF}_2\text{O})_x(\text{CF}_2\text{O})_y\text{CF}_2\text{CH}_2\text{O}- \qquad (II)$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000;

L is a bivalent residue (—C(O)—NH—R—NH—C(O)—) of a diisocyanate; and

T is a terminal group selected from the group consisting of hydrogen, alkyl, substituted alkyl, aryl and substituted aryl.

* * * * *